United States Patent [19]
Chakraborty et al.

[11] Patent Number: 5,643,850
[45] Date of Patent: Jul. 1, 1997

[54] PROCESS FOR THE PRODUCTION OF A CATALYST LAYER ON A CARRIER MATERIAL AND CATALYST WITH A CATALYST LAYER FOR THE REMOVAL OF HYDROGEN FROM A HYDROGEN AND OXYGEN-CONTAINING GAS MIXTURE

[75] Inventors: Amiya Kumar Chakraborty, Erftstadt; Jurgen Rohde, Bergisch-Gladbach; Karl-Heinz Klatt, deceased, late of Julich, by Barbara Klatt, legal representative; Helmut Wenzl, Julich; Ralf Konrad, deceased, late of Sinn, by Irene Konrad, legal representative; Tatjana Konrad, Swisstal-Morenhofen, all of Germany, legal representative

[73] Assignees: Forschungszentrum Julich GmbH; Gesellschaft fur Reaktorsicherheit, both of Cologne, Germany

[21] Appl. No.: 406,155

[22] Filed: Mar. 17, 1995

Related U.S. Application Data

[63] Continuation-in-part of Ser. No. 310,430, Sep. 22, 1994, Pat. No. 5,525,570, which is a continuation-in-part of Ser. No. 122,800, Sep. 15, 1993, abandoned, which is a continuation of Ser. No. 845,146, Mar. 3, 1992, abandoned.

[30] Foreign Application Priority Data

Mar. 9, 1991 [DE] Germany ............... 41 07 595.1
Jun. 28, 1991 [DE] Germany ............... 41 21 418.8

[51] Int. Cl.$^6$ ............... B01J 20/28; B01J 23/40
[52] U.S. Cl. ............... 502/326; 502/325; 502/339; 502/4; 427/455; 427/456
[58] Field of Search ............... 427/455, 456; 502/325, 326, 339, 4

[56] References Cited

U.S. PATENT DOCUMENTS

| | | |
|---|---|---|
| 3,598,635 | 8/1971 | Sagona . |
| 3,925,259 | 12/1975 | Kane . |
| 4,039,698 | 8/1977 | Fraser et al. . |
| 4,076,888 | 2/1978 | Perugini et al. . |
| 4,159,353 | 6/1979 | Adelsberg et al. . |
| 4,422,961 | 12/1983 | Gray . |
| 4,526,839 | 7/1985 | Herman et al. . |
| 4,755,359 | 7/1988 | Klatt et al. . |
| 4,992,407 | 2/1991 | Chakraborty et al. . |
| 5,026,273 | 6/1991 | Cornelison . |
| 5,047,381 | 9/1991 | Beebe . |
| 5,198,405 | 3/1993 | Chakraborty et al. . |
| 5,227,358 | 7/1993 | Takemura et al. . |

FOREIGN PATENT DOCUMENTS

| | | |
|---|---|---|
| 2025430 | 12/1971 | Germany . |
| 3638520 | 5/1988 | Germany . |
| 1346943 | 2/1974 | United Kingdom . |

OTHER PUBLICATIONS

Maissel et al., Handbook of Thin Film Technology, McGraw-Hill, 1970, pp. 6-13 to 6-28 and 8-41 to 8-43. (no month)

*Primary Examiner*—Mark L. Bell
*Assistant Examiner*—David Sample
*Attorney, Agent, or Firm*—Scully, Scott, Murphy & Presser

[57] ABSTRACT

The present invention relates to a process for producing a metallic catalyst layer or coating which serves for effectuating the removal of hydrogen from a gas mixture containing hydrogen and oxygen. The catalyst layer itself which is porous, comprises a metal, such as palladium (Pd) or platinum (Pt), or alloys of these metals, which catalytically influence the oxidation of hydrogen. The metal or the metal alloy is applied as a catalyst layer or coating onto a carrier material or substrate by either plasma spraying or flame spraying together with a jet of an inert gas. The present invention also provides a catalyst through the intermediary of a catalyst layer which is produced in accordance with the process of the instant invention.

22 Claims, 2 Drawing Sheets

PROCESS FOR THE PRODUCTION OF A CATALYST LAYER ON A CARRIER MATERIAL AND CATALYST WITH A CATALYST LAYER FOR THE REMOVAL OF HYDROGEN FROM A HYDROGEN AND OXYGEN-CONTAINING GAS MIXTURE

RELATED APPLICATIONS

This application is a continuation-in-part application of U.S. Ser. No. 08/310,430 filed Sep. 22, 1994, now U.S. Pat. No. 5,525,570 which is a continuation-in-part of U.S. Ser. No. 08/122,800 filed Sep. 15, 1993, now abandoned, which is a continuation of U.S. Ser. No. 07/845,146 filed Mar. 3, 1992, now abandoned.

FIELD OF THE INVENTION

The present invention relates to a process for the production of a metallic catalyst layer or coating which serves for effectuating the removal of hydrogen from a gas mixture containing hydrogen and oxygen. The catalyst layer of the instant invention, which itself is porous, comprises a metal, such as palladium (Pd) or platinum (Pt), or alloys of these metals, which catalytically influences the oxidation of hydrogen. The metal or the metal alloy mentioned hereinabove is applied as a catalyst layer or coating onto a carrier material or substrate by utilizing plasma or flame spraying techniques. By applying the metal or metal alloy by these techniques with simultaneous inert gas injection, especially argon, the catalyst layer itself has pores and tunnels wherein hydrogen can be catalytically oxidized to water. The present invention also provides a catalyst through the intermediary of a catalyst layer which is produced in accordance with the inventive process.

The elimination of hydrogen from a hydrogen and oxygen-containing and thereby potentially explosive gas mixture is of particular significance in connection with nuclear power plant accidents. Above all, such gas mixtures can be encountered during nuclear core accidents in light-water reactors, as well as in heavy water-moderated reactors. Moreover, the elimination of hydrogen during the incinerating of waste materials or refuse also presents a problem, in that hydrogen can be generated during incineration and represent a danger of explosion.

From the disclosures of German Patent 36 04 416 and German Patent 37 25 290 it has become known that palladium or palladium alloys, in particular palladium-nickel-copper alloys, as well as palladium-silver and palladium-copper, can be utilized for catalysis. The catalysts are applied as thin catalyst layers or coatings on a carrier material or substrate for their mechanical stabilization. The above-mentioned metals and metal alloys, as well as also platinum in a metallic and alloyed form, possess good catalyzing capability even in the presence of steam in an atmosphere containing hydrogen and oxygen. These metals or metal alloys when used as a catalyst layer possess short response times between the encountering of hydrogen in the atmosphere and the commencement of the catalytic oxidation reaction.

Until now, the catalyst layers were either vapor-deposited or sputtered onto the carrier materials. These techniques require complicated and expensive apparatuses. Furthermore, catalysts manufactured on a metallic substrate by vacuum deposition, sputtering or electrodeposition are all characterized by a monolayer of catalyzing surface which is burdened by the task to heat-up the same mass of substrate for a higher reaction rate. Hence, these catalysts are slow in reaction and cool down quickly due to heat transfer from the surface. Moreover, the adhesive strength of such catalyst layers is inadequate for use in nuclear reactors, wherein after repeated operations, the catalyst layer loosens itself and chips off from the carrier material as a result of the development of heat during the catalyzation process. Inasmuch as the catalytic capability of the chipped off material remains effective, such portions of the catalyst material tend towards their incandescence and lead to the ignition of locally-forming ignitable gas mixtures.

The surface requirement which is necessary for the catalytic conversion of hydrogen is dependent upon the catalyzing ability of the catalyst layer for each $cm^2$ of basic surface area of the layer or; in essence, for each $cm^2$ of carrier material or substrate surface. The need for surface area increases in conformance with the lower the catalyzing ability of the catalyst layer.

SUMMARY OF THE INVENTION

Accordingly, it is an object of the present invention to provide a catalyst layer which has a high degree of adhesive strength when applied onto a carrier material or substrate, and possesses a good catalyzing ability.

The foregoing object is attained in the present invention by applying a porous catalyst layer or coating to at least a partial region of the carrier material through either plasma spraying or flame spraying. In accordance with the foregoing, i.e. the application of the catalyst layer on the carrier material by means of either plasma coating or flame spraying together with an inert gas, a catalyst layer is produced which itself is porous in two respects, namely, the catalyst layer has tunnels (i.e. passages within the catalyst layer which are separated by catalyst material from the atmosphere prevailing at the external surface of the catalyst layer) wherein hydrogen can be catalytically oxidized to water, and the catalyst layer has pores connecting the tunnels to the external surface of the catalyst layer. The porosity of the catalyst layer and its surface roughness increase the total surface of the catalyst material which is available for the catalytic reaction and, as a consequence, increases the catalyzing ability of the catalyst layer per each $cm^2$ of carrier material. Essential for the size of the surface that is available for the catalysis is the open porosity of the catalyst layer caused by the infiltrated inert gas which is attained in the present invention by either plasma spraying or flame spraying. Since the catalysts of the instant invention have an increased surface for each unit of surface area of carrier material, at an increased hydrogen conversion the temperature of the inventive catalyst layer also rises in comparison with vapor-deposited or sputtered catalyst layers. Thus, as a result of the exponential increase in the conversion of hydrogen at a rising temperature, there is also achieved in the present invention a more rapid recombination of the hydrogen constituent in the gas mixture. This rapid recombination reduces the probability that localized explodable gas mixtures will be formed by encountered hydrogen.

In order to achieve an improvement in the adhesive strength or bond between the catalyst layer and the carrier material, the carrier material can be heat-treated in an atmosphere which is constituted of hydrogen and/or an inert gas subsequent to its coating. In the present invention, it is intended that there is homogenized an intermediate layer formed in the transitional region between the catalyst layer and the carrier material during either plasma spraying or flame spraying by an intensified high temperature diffusion between the metallic catalyst and the carrier material. The high temperature diffusion also helps to relieve strain occurring due to high cooling rate as well as promotes the growth of a strain free intermediate layer increasing the life time of the catalysts against frequent heating up and cooling down.

A suitable metal alloy for plasma spraying is palladium-nickel (PdNi). When employing flame spraying, suitable metal or metal alloys are palladium (Pd), platinum (Pt), or palladium-nickel (PdNi). Nickel in conjunction with palladium, evidenced by preferred properties, is particularly preferred in the instant invention for application by either plasma or flame spraying processes. In addition, it reduces the costs of the material for the catalyst layer and, upon occasion, bonds CO contained in the gas mixture as a catalyst poison through the formation of a carbonyl.

The formation of the catalyst layer by either plasma or flame coating on the carrier material is also advantageously employable for the formation of localized material zones constituted from a material which is itself distinguishable from the catalyst material. Preferably, pursuant to the instant invention, there are applied localized regions of nickel adjacent to the catalyst layer along the surface edge of the carrier material. The application of such a material at the edge of the surface of the carrier material assists in avoiding disturbing location within the catalyst layer which could adversely influence the adhesive bond on the carrier material.

For the formation of the inventive catalyst layer there is employed a metal powder of catalytic material possessing grain sizes within the range of between about 0.1 to 1000 µm; preferably between 20 to 60 µm.

The carrier material or substrate employed in the instant invention is expediently selected at a thickness of between about 0.1 to 5 mm; preferably the carrier material has a thickness of between about 1 to 3 mm. The thickness of the catalyst layer or coating consists of between about 0.01 to 1 mm; preferably 0.1 mm. The catalyst layer which is applied onto the carrier material or substrate is thus approximately $\frac{1}{10}$ the thickness of the carrier material.

BRIEF DESCRIPTION OF THE DRAWINGS

The inventive process and the metallic catalyst produced pursuant to the inventive process are now described hereinbelow on the basis of exemplary embodiments and in conjunction with the accompanying drawings; in which.

DETAILED DESCRIPTION

Figure 1:
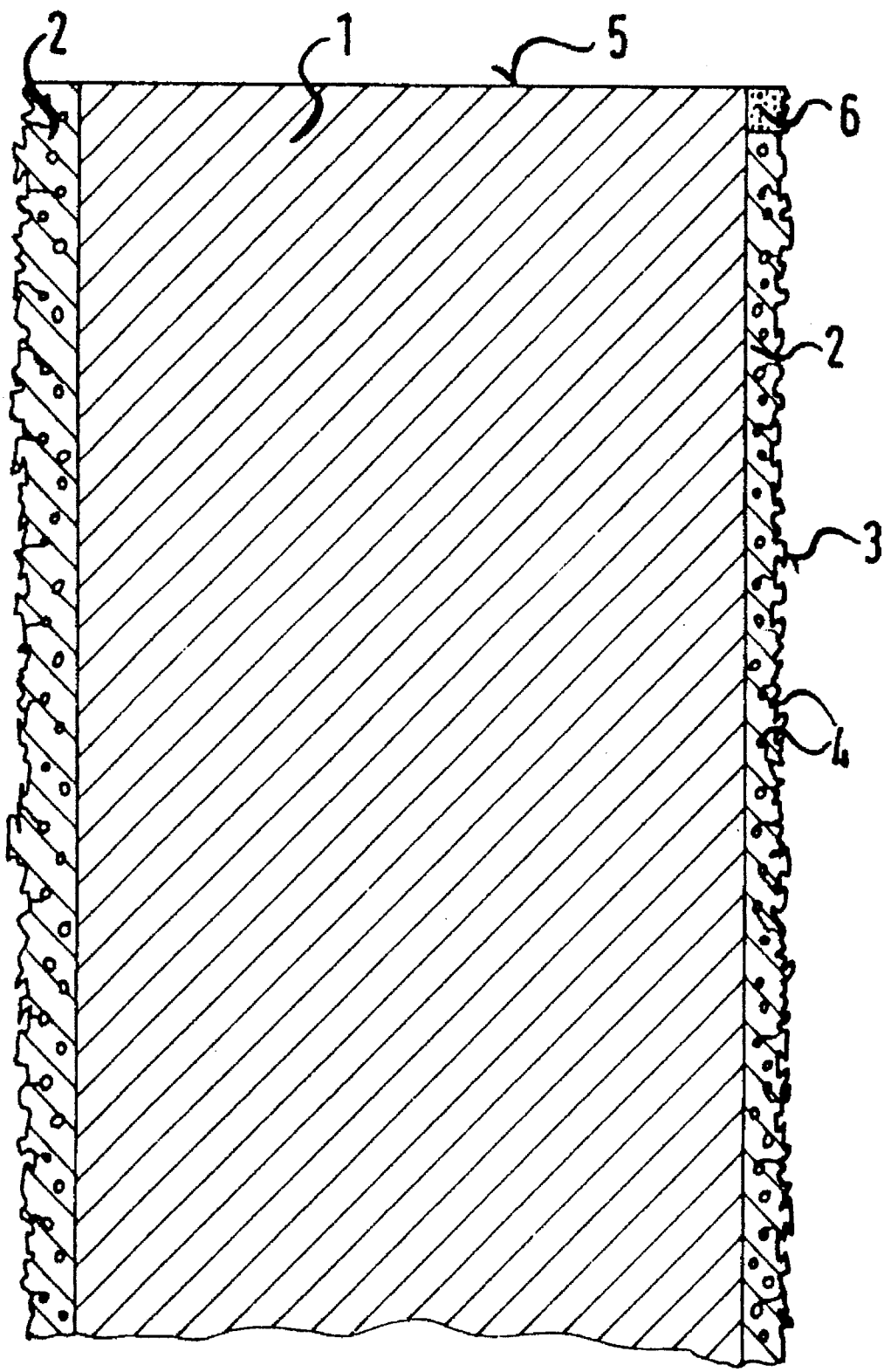
FIG. 1 illustrates a diagrammatic cross-sectional view of a catalyst with a coated carrier material, in which the catalyst layer is formed by a plasma spraying process.

In the drawings, FIG. 1 illustrates a cross-sectional view through a catalyst which comprises a carrier material or substrate 1 having a catalyst or catalytic layer 2 applied on both sides thereof. The catalyst layer 2 is applied in this case by a plasma spraying process wherein the metallic powders to form the coating were driven out of the nozzle of the spray by a jet of inert gas like argon. (1) During the rapid cooling down, the molten metal being entrained by inert gas freezes quickly. Some of the inert gas is forced out during cooling through the pores and the tunnels. Tunnels are the paths of their release during the solidification when the deposited material is still soft to allow the release. (2) As the surface of powders is large so they carry adsorbed gases on the surface. These gases remain also entrained in the liquid and get released during solidification. A solid material has less capacity to retain gas than the liquid. The catalyst layers are porous and as a result provide large overall surfaces 3. The pores which are formed during plasma spraying are essentially open and produce externally accessible hollow spaces, especially tunnel-shaped small tubes. These tunnel-shaped tubes (the "tunnels", as defined hereinabove) are especially important in the present invention since they provide additional important space wherein hydrogen can be catalytically oxidized to water. Hence, an atmospheric gas mixture containing hydrogen and oxygen can penetrate through the surface pores of the catalyst to the internal pores and tunnels wherein hydrogen and oxygen catalytically react to produce water. These three-dimensional areas provided by the internal pores and tunnels with access to the surface of the catalyst provide an overall larger surface area compared to the surface of the catalyst.

In the case of utilizing a flame spraying process with the melting of the spray materials on the carrier material surface, smoother surfaces are formed on the carrier material in comparison to flame spraying without smelting. Accordingly, in the drawing the surface 3' of the catalyst is illustrated in a phantom representation.

In the illustrated embodiment, the surface edge 5 of the carrier material has nickel applied thereon in a localized zone 6.

Figure 2:
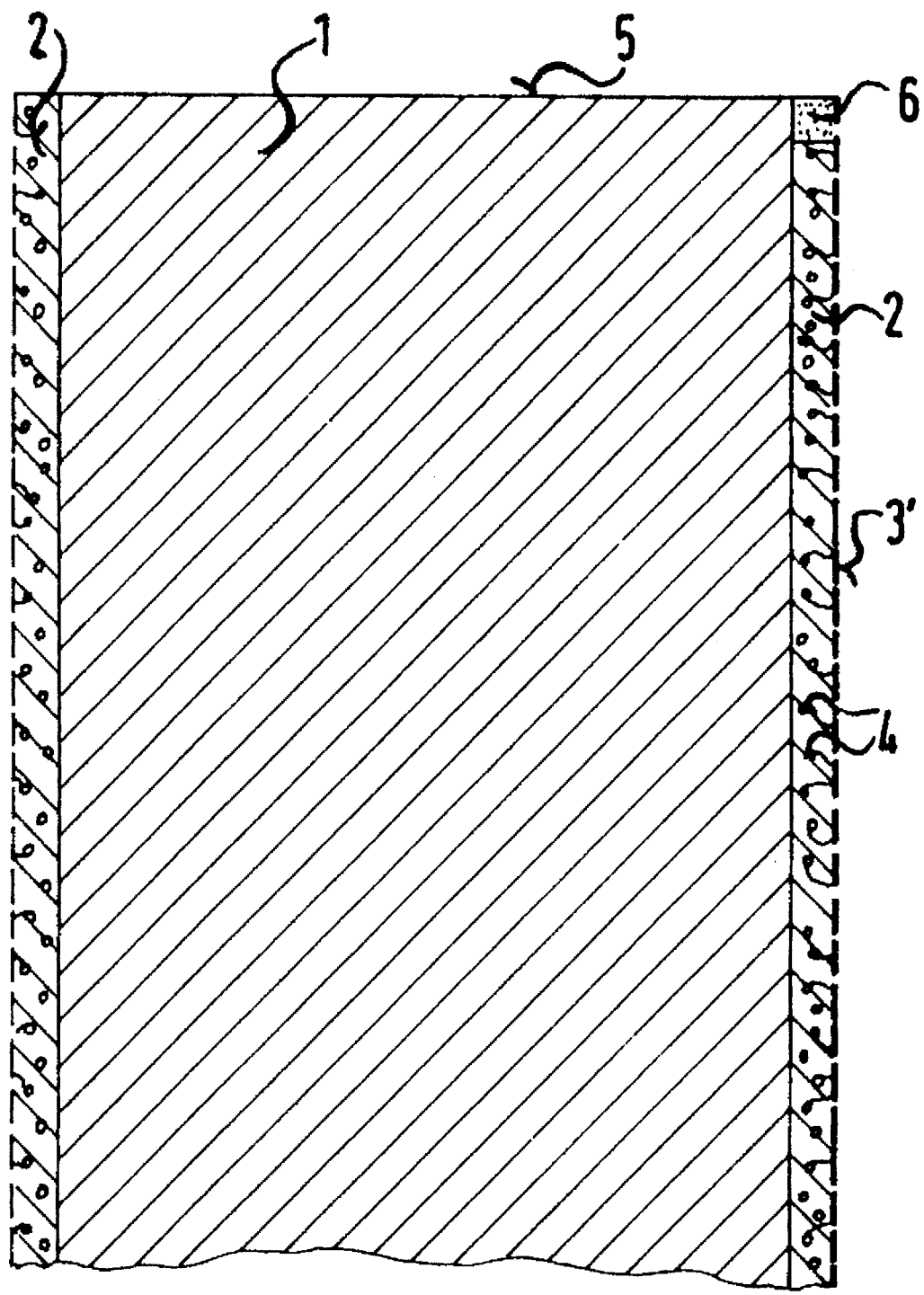
FIG. 2 illustrates a second embodiment of the catalyst, in a view similar to FIG. 1, in which the catalyst layer is formed by a flame spraying process.

Referring to the invention as illustrated in FIG. 2 of the drawings, in which elements identical with or similar to those in FIG. 1 are identified by the same numerals, in this case the catalyst layer 2 is applied on both sides of the carrier material through a flame spraying process rather than plasma spraying. Herein, the utilization of the flame spraying process with smelting of the sprayed catalyst material on the surface of the carrier material or substrate, in contrast with flame spraying without smelting or plasma spraying, forms smoother surfaces 3', as represented by the phantom-lines, rather than rough surfaces 3 as shown in FIG. 1.

Pursuant to both embodiments, the catalyst layer is sprayed onto a carrier material or substrate of 2.5 mm thickness which is composed of an austenitic steel. The carrier material can be sand-blasted and cleaned preceding the plasma spraying or flame spraying as applicable.

For example, in implementing the plasma spraying process, a palladium powder possessing grain sizes in the range of between about 0.1 and 1,000 µm was employed. The powder was sprayed onto the carrier plate with the utilization of argon as an inert gas by means of a plasma burner. The catalyst layer adheres thereto primarily through mechanical clamping engagement and through diffusion and due to the formation of a very thin layer of an alloy. In the exemplary embodiment, the coating thickness of the catalyst layer is about 60 and to about 100 µm and, in general, is determined in such a manner that the catalyst material completely covers the surface of the carrier material.

The adhesion between the catalyst layer and the carrier material is further improved in that the carrier material is heated and kept at higher temperatures prior to the plasma spraying or flame spraying, and temperature differences encountered between the plasma jet or flame jet and the carrier material are reduced during the contacting thereof by the catalyst material. A heated carrier material at different temperatures influences the time of cooling down of the catalytic powders and thus influences the porosity of the catalyst. Also, longer residence time due to heating will promote diffusion between the metallic powders as well as between the deposited powders and carrier material thus promoting a strong flow and an intermediate alloy formation between the powders and the carrier material. If a post heat treatment step at high temperatures is employed, then this will also promote both interdiffusion of the powders as well as the formation of the interfacial bondage between the carrier material and the catalytic layer.

The catalyst layer was applied onto a carrier material plate having a surface area of about 20 to 40 mm$^2$ and, during test investigations for the catalysis of hydrogen, tested as a catalyst layer in a gas atmosphere containing, besides hydrogen and oxygen, carbon monoxide. The catalytic activity of a catalyst can be retarded or even jeopardized by the presence of gaseous poisons like CO or by poisons existing in the form of aerosols like sulfur or iodine on the catalyst surface. However, in the present invention, the catalytic properties were maintained without any deterioration thereof even after the implementation of a large number of investigative uses of the catalyst (more than 60 tests). An advantage of the inventive catalyst having internal tunnel-like pores interconnected with each other and to the surface is that the gas mixture penetrates into the pores leaving the poisons at the surface. After the initiation of the catalytic reaction and formation of steam within the pores, the driving force of steam exiting the pores generally blocks the surface area of the catalyst from further deposition and even washes away the deposited poisons. It has been found that even the presence of CO does not retard the catalytic reaction implementing the present invention; due to rapid heating of the catalyst which thus deactivates the poisoning effect of CO at higher temperature.

In accordance with the concentration of the hydrogen in the gas mixture, a corresponding reaction temperature sets itself in the catalyst material. Temperatures of up to 600° C. were reached depending on the size of catalytic surface and hydrogen concentrations employed.

Metallographic examinations of the coated carrier material indicated that even after a large number of operating hours and applicable heat generation, the adherence of the catalyst layer to the carrier material was not adversely influenced and no chipping off was observed.

Pursuant to a further exemplary embodiment of the present invention, a 4.8 to 5.5 µm thick catalyst layer consisting of palladium was applied onto a carrier plate of austenitic steel having a thickness of 2.5 mm. The range in the grain sizes of the palladium powder that was applied was between about 0.2 to 0.6 µm. Subsequent to the plasma coating, the coated carrier material was subjected to heat treatment. The metallographic examinations of this catalyst indicated that at the location of the seam between the carrier material and the catalyst layer an adequate transitional layer appeared between the catalyst and the carrier material. This transitional layer prevented chipping off of the catalyst layer.

Pursuant to a further example, by mixing a coarse powder fraction with a powder fraction possessing a smaller grain size, there could be ascertained the attainment of compaction of the catalyst material in the transitional region between the catalyst layer and the carrier material. As a palladium-nickel alloy there was sprayed on a powder mixture having a 1:1 ratio by volume between palladium and nickel.

Moreover, for relatively thick catalyst layers on the carrier material, after 30 catalyzing test, no chipping off of the catalytic layer was observed. The catalyst layer and its catalytic effectiveness on the carrier material remained unchanged.

Although the foregoing investigations are set primarily on the basis of the plasma spraying process, investigations indicated that identical results were obtained by employing the flame spraying process, and the above-mentioned data are equally applicable thereto.

What is claimed is:

1. In a process for the formation of a metallic catalyst layer which is utilized for the removal of hydrogen from a gas mixture containing hydrogen and oxygen, said catalyst layer being constituted from a metal or metal alloy catalytically influencing the oxidation of the hydrogen; and a carrier material having said catalyst layer applied thereon, wherein said carrier material is a metallic carrier plate; the improvement wherein said catalyst layer is a metallic material selected from the group consisting of palladium, platinum and palladium-nickel alloys and is a porous catalyst layer coated at least in a partial region onto the carrier material by plasma spraying or flame spraying together with a jet of an inert gas, wherein the catalyst layer formed thereby has tunnels within the catalyst layer, separated from the surrounding atmosphere by catalyst material, and has pores connecting said tunnels to the external surface of the catalyst layer.

2. A process according to claim 1 wherein the coated carrier material is heat-treated in an atmosphere constituted of hydrogen and an inert gas.

3. A process according to claim 1 further comprises at least one localized nickel zone that is arranged adjacent to said catalyst layer.

4. A process according to claim 3 wherein nickel is applied to the carrier material at a surface edge which is adjacent to the catalyst layer.

5. A process according to claim 1 wherein the carrier material is heated and kept at higher temperatures prior to the plasma spraying or flame spraying thereon of the catalyst layer.

6. A process according to claim 1 wherein the metallic material is a metal powder having grain sizes within the range of about between 0.1 to 1,000 µm.

7. A process according to claim 6 wherein said grain sizes are within the range of about 20 to 60 µm.

8. A process according to claim 1 wherein the carrier material has a thickness of between 0.1 to 5 mm.

9. A process according to claim 8 wherein the carrier material has a thickness of between about 1 to 3 mm.

10. A process according to claim 1 wherein said catalyst layer has a thickness within the range of about 0.01 to 1 mm.

11. A process according to claim 10 wherein said catalyst layer has a thickness of 0.1 mm.

12. A process according to claim 1 wherein the inert gas is argon.

13. In a metallic catalyst for the removal of hydrogen from a gas mixture containing hydrogen and oxygen, said catalyst being constituted from a metal or a metal alloy catalytically influencing the oxidation of the hydrogen, and said catalyst being applied as a layer onto a carrier material, wherein said carrier material is a metallic carrier plate; the improvement wherein the catalyst layer is a metallic material selected from the group consisting of palladium, platinum and palladium-nickel alloys and is porous and is applied onto the carrier material by plasma spraying or flame spraying together with a jet of an inert gas, wherein the catalyst layer formed thereby has tunnels within the catalyst layer, separated from the surrounding atmosphere by catalyst material, and has pores connecting said tunnels to the external surface of the catalyst layer.

14. A catalyst according to claim 13 wherein the catalyst layer is formed from a metal powder having grain sizes within the range of between 0.1 to 1,000 μm.

15. A catalyst according to claim 14 wherein said metal powder has a grain size within the range of about 20 to 60 μm.

16. A catalyst according to claim 13 wherein the carrier material has a thickness of between about 0.1 to 5 mm.

17. A catalyst according to claim 16 wherein said carrier material has a thickness of about 1 to 3 mm.

18. A catalyst according to claim 13 wherein the catalyst layer has a thickness within the range of about 0.01 to 1 mm.

19. A catalyst according to claim 18 wherein the catalyst layer has a thickness of 0.1 mm.

20. A catalyst according to claim 13 further comprising at least one localized nickel zone that is arranged adjacent to said catalyst layer.

21. A catalyst according to claim 20 wherein the nickel zone is located at a surface edge of the carrier material.

22. A catalyst according to claim 13 wherein the inert gas is argon.

* * * * *